No. 845,807. PATENTED MAR. 5, 1907.
H. G. MILLER.
WATER SEPARATOR.
APPLICATION FILED FEB. 27, 1905.
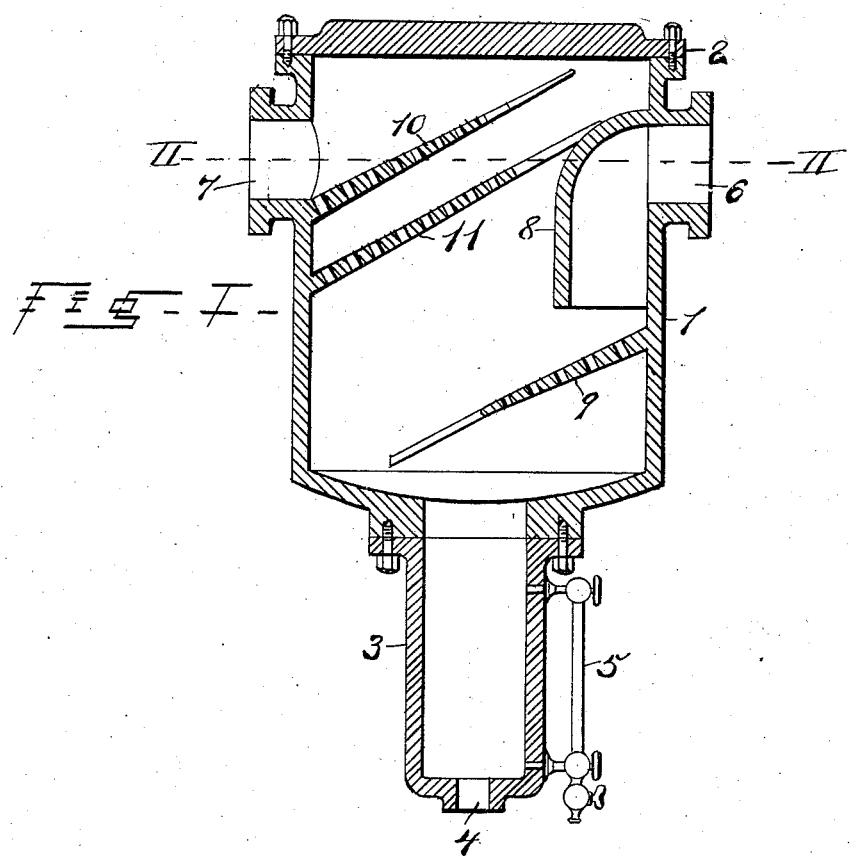
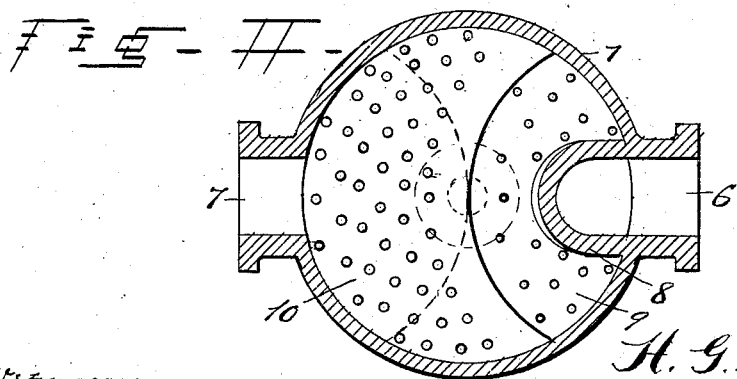

UNITED STATES PATENT OFFICE.

HENRY G. MILLER, OF CLEVELAND, OHIO, ASSIGNOR TO LOEW SUPPLY & MANUFACTURING COMPANY, OF CLEVELAND, OHIO, A CORPORATION OF NEW JERSEY.

WATER-SEPARATOR.

No. 845,807.  Specification of Letters Patent.  Patented March 5, 1907.

Application filed February 27, 1905. Serial No. 247,438.

*To all whom it may concern:*

Be it known that I, HENRY G. MILLER, a citizen of the United States, and a resident of Cleveland, county of Cuyahoga, and State of Ohio, have invented certain new and useful Improvements in Water-Separators, of which the following is a specification, the principle of the invention being herein explained and the best mode in which I have contemplated applying that principle, so as to distinguish it from other inventions.

The annexed drawings and the following description set forth in detail one mechanical form embodying the invention, such detail construction being but one of various mechanical forms in which the principle of the invention may be used.

In said annexed drawings, Figure I represents an axial section of my improved water-separator, and Fig. II a horizontal section on the line II II in Fig. I.

The separator has a cylindrical casing 1, the upper end of which is closed by a removable cover 2. A cylindrical reservoir 3 of smaller diameter than the casing is secured to the bottom of the casing and has an outlet-opening 4 in its lower end, which may be suitably connected to a waste-trap, so that the reservoir may be emptied whenever it becomes filled with condense water. A gage-glass 5 is provided at the side of the reservoir to permit of visual inspection of the water-level in the reservoir. A steam-inlet 6 is formed in one side of the casing near the top of the same, and a steam-outlet 7 is formed in the casing diametrically opposite to the inlet. The inlet is continued within the casing by a downwardly-curved steam-inlet pipe 8, which extends some distance below the inlet. An inclined and perforated baffle-plate 9 extends from the wall of the casing beneath the open lower end of the curved inlet-pipe, inclining toward the axis of the casing. Two similar inclined baffle-plates 10 and 11 extend from the opposite side of the casing one above the other and both above the first-mentioned baffle-plate.

In practice the water-separator is coupled into the steam-supply pipe between the boiler and the engine. As steam enters at the inlet it is deflected toward the bottom of the casing, and any water carried over with the steam will be intercepted by the baffle-plate 9 and pass down the face of the same and fall into the reservoir. Ascending steam will be intercepted by the two opposed baffle-plates, which will deprive such steam of any remaining water, permitting the steam to ascend through the perforations and pass out through the outlet. The water collecting in the reservoir may be drawn off by a suitable waste-trap or in any other suitable or desired manner.

By the employment of this separator any water carried over with the steam from the boiler caused by priming of the latter or by any other cause will be intercepted and directed to the reservoir by the perforated baffle-plates, while the dry steam will pass through the perforations in the plates and out through the outlet. The construction and operation of the separator is simple and inexpensive, and its function is prompt and thorough, insuring perfectly dry steam for the engine regardless of how wet and saturated with free water the steam may be when it leaves the boiler and enters the separator.

Other modes of applying the principle of my invention may be employed for the mode herein explained. Change may therefore be made as regards the mechanism thus disclosed, provided the principles of construction set forth respectively in the following claim is employed.

I therefore particularly point out and distinctly claim as my invention—

In a water-separator, the combination with a casing having a reservoir at its bottom with a water-outlet and having a downwardly-extending steam-inlet in one side near its closed top and a diametrically-opposed steam-outlet, of a perforated baffle-plate arranged beneath the inlet and inclined toward the bottom of the casing and an opposed perforated baffle-plate above the latter plate and beneath the outlet and inclined toward the top of the casing.

In testimony that I claim the foregoing to be my invention I have hereunto set my hand this 2d day of December, A. D. 1904.

HENRY G. MILLER.

Witnesses:
WM. SECHER.
E. D. GRUMNEY.